July 14, 1931.  Z. SATO  1,814,339
PLANT SHIELD
Filed May 16, 1929
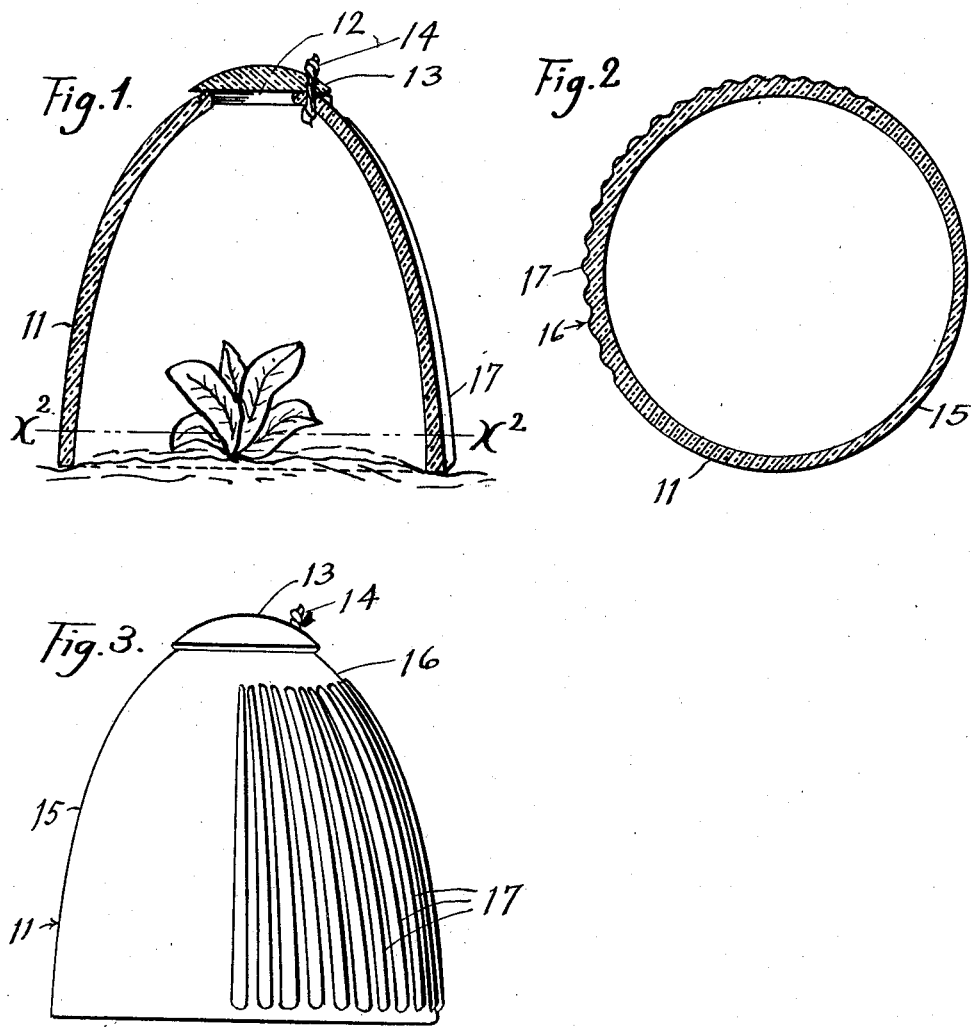
INVENTOR:
ZENTARO SATO.
BY ATTY:

Patented July 14, 1931

1,814,339

UNITED STATES PATENT OFFICE

ZENTARO SATO, OF SANTA ANA, CALIFORNIA

PLANT SHIELD

Application filed May 16, 1929. Serial No. 363,510.

This invention relates to improvements in a plant shield, adapted for shielding young plants from excessive rain, wind, cold, from insects, and for the protection of the soil adjacent to the plants.

An object of this invention is to provide a plant shield to afford protection to small plants from frosts, excessive wind, rain, insects, birds and snails, to provide a shield of inexpensive material, a shield which may be quickly applied for use, and which may be adjusted for particular requirements.

Heretofore, the practice has been to construct shields from paper, which, owing to lightness, are difficult to apply, which will deteriorate on exposure, which are liable to be blown away by the wind, and which are liable to collapse and thereby prevent the proper growth of a plant.

To avoid these objections, I construct my improved plant shield of glass, which is more rigid than paper, which is corrugated to shed rain, which is more durable than paper, which may be readily emplaced for plant protection, and which may be adjusted for ventilation and for protecting the plant from heat, light, rain, and other deteriorating elements.

While the drawings exhibit a preferred form of the invention, it is to be understood that minor changes, alterations and modifications, falling within the scope of the appended claims, may be resorted to if desired.

The present device is constructed in the form of a cone, to be applied for use for plant protection, with the apex at the top, and provided with a cover, and, being of glass, the device may be emplaced without covering with soil, will shed the rain easily, will not be blown away, will protect from the ravages of insects, birds and snails, will withstand the effects of time, may be adjusted for varying the light admitted, and may be ventilated by placing the cover in open position, all effective for plant protection.

In the drawings: Figure 1 is a sectional elevation of the device. Fig. 2 is a sectional plan on line $X^2$—$X^2$, of Fig. 1. Fig. 3 is a side elevation of the device.

Referring to the drawings in detail, the shield body 11, is of a conical form, having an opening 12, at the top, covered by a closure member 13, which is secured to the body by a cord 14. The body 11 has a thin side 15, and a thicker side 16, which has longitudinal corrugations 17.

In use, the shield is positioned over the plant, and adjusted with the thinner side to the sun-light, or, in excessively hot weather, with the thicker and corrugated side to the sun-light. The corrugated surface serves to shed the rain quickly, thereby preventing frost from forming on the exterior in colder weather, and serves to diffuse light and heat. The conical form, and weight of the material of which the device is constructed, insure that the shield will not be displaced by moderate and ordinary winds. The particular curvature of the body, together with the corrugations thereon, prevent moisture and dust from collecting thereon and adhering thereto.

What is claimed is:

1. A plant shield comprising a conical body with an opening at the apex thereof, a cover for the opening, a relatively thin side on the body, and a relatively thick side opposed to the thin side, and a series of corrugations on the thicker side.

2. A plant shield, comprising a conical body, having opposed walls, one being relatively thin, and the other relatively thick, and a series of corrugations on the thicker wall.

3. A plant shield, comprising a transparent and conical body having an opening at the apex, a cover for the opening, means for retaining the cover in connection with the body, the body having relatively thick and thin opposed walls, and a series of longitudinal corrugations in the thicker wall.

4. A plant shield, comprising a body having a parabolic exterior and interior, one side wall relatively thicker than the other, and longitudinal corrugations in the thicker wall.

In testimony whereof, I hereunto affix my signature.

ZENTARO SATO.